(12) United States Patent
Enobakhare

(10) Patent No.: US 10,853,771 B2
(45) Date of Patent: Dec. 1, 2020

(54) SYSTEM AND METHOD FOR SETTLING MULTIPLE PAYEES FROM A SINGLE ELECTRONIC AND/OR CHECK PAYMENT

(71) Applicant: Mroute Corp., New York, NY (US)

(72) Inventor: Hugh Enobakhare, Jamaica, NY (US)

(73) Assignee: Mroute Corp., New York, NY (US)

( * ) Notice: Subject to any disclaimer, the term of this patent is extended or adjusted under 35 U.S.C. 154(b) by 0 days.

(21) Appl. No.: 15/763,074

(22) PCT Filed: Nov. 23, 2016

(86) PCT No.: PCT/US2016/063547
§ 371 (c)(1),
(2) Date: Mar. 23, 2018

(87) PCT Pub. No.: WO2017/054016
PCT Pub. Date: Mar. 30, 2017

(65) Prior Publication Data
US 2018/0285836 A1 Oct. 4, 2018

Related U.S. Application Data

(60) Provisional application No. 62/222,674, filed on Sep. 23, 2015.

(51) Int. Cl.
*G06Q 20/04* (2012.01)
*G06Q 20/02* (2012.01)
(Continued)

(52) U.S. Cl.
CPC ....... *G06Q 20/0425* (2013.01); *G06Q 20/023* (2013.01); *G06Q 20/042* (2013.01);
(Continued)

(58) Field of Classification Search
CPC ........... G06Q 20/0425; G06Q 20/1085; G06Q 40/00; G06Q 20/00
See application file for complete search history.

(56) References Cited

U.S. PATENT DOCUMENTS

| 5,677,955 A | 10/1997 | Doggett et al. |
| 6,983,261 B1 | 1/2006 | Francisco et al. |

(Continued)

FOREIGN PATENT DOCUMENTS

| CN | 104680363 A | 6/2015 |
| JP | H11-503541 A | 3/1999 |

(Continued)

OTHER PUBLICATIONS

European Patent Application No. 16849906.9; Extended Search Report; dated May 17, 2019; 10 pages.
(Continued)

*Primary Examiner* — Daniel S Felten
(74) *Attorney, Agent, or Firm* — BakerHostetler

(57) ABSTRACT

A system and method is disclosed that facilitates electronic payment to multiple payees from a single electronic payment transaction and/or from a multiple payee check payment. The system includes a database storing payor and payee identity, address, and bank account information and a processor that executes instructions causing the processor to initiate a multiple payee payment and/or a multiple payee check handling and clearing process including determining identity of the payor and/or receiving the payor's check information; receive identification of multiple payees; place a hold on a payor's bank/card account and/or accept multiple payee check deposit via an ATM; alert respective payees that funds are available; enable payee electronic check endorsement and/or identity verification for the respective payees; receive electronic payee endorsement and confirmation of identity and provide an endorsement file to the payor for each payee; debit the payor's account in respective amounts owed the respective payees; and disburse the respective amounts to the respective payees through a payment network.

36 Claims, 15 Drawing Sheets

(51) Int. Cl.
*G06Q 20/10* (2012.01)
*G06Q 20/40* (2012.01)
*G06Q 40/08* (2012.01)
*G06F 16/27* (2019.01)

(52) U.S. Cl.
CPC ..... *G06Q 20/1085* (2013.01); *G06Q 20/4014* (2013.01); *G06Q 40/08* (2013.01); *G06F 16/27* (2019.01)

(56) References Cited

U.S. PATENT DOCUMENTS

| | | | | |
|---|---|---|---|---|
| 7,539,646 B2 * | 5/2009 | Gilder | ............... | G06Q 20/04 |
| | | | | 705/40 |
| 8,121,994 B2 * | 2/2012 | Soemo | ............... | G06F 16/24552 |
| | | | | 707/705 |
| 8,285,629 B2 * | 10/2012 | Lutnick | ............... | G06Q 40/04 |
| | | | | 705/37 |
| 8,321,323 B2 * | 11/2012 | Lutnick | ............... | G06Q 40/04 |
| | | | | 705/37 |
| 8,758,108 B2 * | 6/2014 | Amaitis | ............... | G07F 17/34 |
| | | | | 463/16 |
| 9,293,009 B2 * | 3/2016 | Asher | ............... | G07F 17/32 |
| 2002/0111915 A1 | 8/2002 | Clemens et al. | | |
| 2002/0133459 A1 | 9/2002 | Polk et al. | | |
| 2006/0235795 A1 | 10/2006 | Johnson et al. | | |
| 2006/0259394 A1 * | 11/2006 | Cushing | ............... | G06Q 40/04 |
| | | | | 705/37 |
| 2007/0038548 A1 * | 2/2007 | Schlifstein | ............... | G06Q 40/00 |
| | | | | 705/37 |
| 2007/0083452 A1 * | 4/2007 | Mayle | ............... | G06Q 40/06 |
| | | | | 705/36 R |
| 2007/0150405 A1 * | 6/2007 | Greenberg | ............... | G06Q 30/08 |
| | | | | 705/37 |
| 2007/0288342 A1 * | 12/2007 | Maclin | ............... | G06Q 40/04 |
| | | | | 705/37 |
| 2008/0021803 A1 * | 1/2008 | Ahles | ............... | G06Q 20/04 |
| | | | | 705/35 |
| 2010/0161466 A1 | 6/2010 | Gilder | | |
| 2011/0106675 A1 | 5/2011 | Perlman | | |
| 2012/0084162 A1 | 4/2012 | Smith et al. | | |
| 2014/0304149 A1 | 10/2014 | Hockridge et al. | | |
| 2015/0149344 A1 | 5/2015 | Kumar et al. | | |
| 2018/0285836 A1 * | 10/2018 | Enobakhare | ............... | G06Q 20/042 |

FOREIGN PATENT DOCUMENTS

| | | |
|---|---|---|
| JP | 2001-283118 A | 10/2001 |
| JP | 2003-281305 A | 10/2003 |
| JP | 2003-316958 A | 11/2003 |
| JP | 2006-285623 A | 10/2006 |
| JP | 2007-042056 A | 2/2007 |
| JP | 2009-534741 A | 9/2009 |
| JP | 2011-044055 A | 3/2011 |
| JP | 2015-035127 A | 2/2015 |

OTHER PUBLICATIONS

International Patent Application No. PCT/US2016/063547; Int'l Preliminary Report on Patentability; dated Apr. 5, 2018; 8 pages.
Singapore Patent Application No. 11201802356P; Written Opinion and Search Report; dated Jul. 15, 2019; 9 pages.

* cited by examiner

SYSTEM AND METHOD FOR SETTLING MULTIPLE PAYEES FROM A SINGLE ELECTRONIC AND/OR CHECK PAYMENT

CROSS REFERENCE TO RELATED APPLICATIONS

The present application is a National Stage Application filed under 35 U.S.C. 371 of International Application No. PCT/US2016/063547, filed Nov. 23, 2016, which claims the benefit under 35 U.S.C. 119(e) of U.S. Provisional Patent Application No. 62/222,674, filed Sep. 23, 2015, both of which are incorporated herein by reference in their entirety.

TECHNICAL FIELD

The invention is generally related to systems and methods for facilitating electronic payment to multiple payees from a single electronic payment or multiple payee check payment.

BACKGROUND

Currently there are no electronic payment systems that can resolve an electronic or multiple payee check payment through the network of an automated clearing house (ACH)/debit or credit card network, etc. into multiple payees' or stakeholders' various accounts (e.g., bank, card, social media/network account, closed loop system accounts) simultaneously. The existing ACH network and other payment processing networks cannot currently be used to credit the accounts of multiple payees that are all payees on a single transaction/instrument/payment. This is because in conventional payment systems, once a payment transaction is processed it can only be deposited into one specified account. A single payment that is payable to more than one payee cannot currently be done using any of the electronic payment options available, except for issuing a paper check made payable to multiple payees. However, if a multiple payee check is issued, the payees must figure out a way to physically endorse the instrument, usually in the presence of an account's manager or representative, before an authorized deposit is allowed into only one of the payee's accounts. Automated teller machine (ATM) deposits of multiple payee checks are normally not allowed since the checks' endorsements must be physically verified and authorized by the depository institution's representative before a deposit is allowed.

Although the multiple payee problem affects insurance claims, there are many other businesses, government organizations, individuals, etc., that have the same issues preventing them, the payors, from sending a single electronic payment to two or more payees or to be able to conveniently deposit a multiple payee check where they are made payee. For example, based on the insurance policy in force, when a claimant files an insurance claim, the payees normally involved can range from only the claimant/policyholder/beneficiary, to multiple payees including, but not limited to, financial institutions, mortgagees, lienholders, etc. There can be additional interested parties/stakeholders/payees to such a payment, which can include, but is not limited to, attorneys, contractors, body shops, hospitals/medical centers/doctors, etc. When a Property and Casualty (P/C) insurance claim payment is made by an insurer, normally with paper checks, based on the type of policy in force it can have the financial institution/mortgagee and policyholder(s) and/or claimant(s) all as payees, in addition to any other payees or interested parties. In Life and Health (L/HI) insurance, a claim payment or surrender can also include multiple payees, beneficiaries, annuitants, etc.

Regarding a P/C insurance claim, normally a situation as described above will end up with the financial institution/mortgagee, lienholder, etc., receiving the check payment after all other parties have endorsed. The financial institution/mortgagee/lienholder can either endorse and return, or endorse and deposit the payment into their bank account before they begin the disbursement process to all the other stakeholders including the policyholder/claimant, attorneys, contractors, etc. This is made possible and allowed because of the "mortgage clause" or "lienholder clause" in a given policy that a policyholder agreed to when the policy was purchased.

The same process is practiced for L/H insurance claims. For example, a late parent's insurance benefit may be payable to all the children as payees on a single instrument. This means that if the children reside in different states, they have to somehow find a way to all endorse that check payment before they may collect the funds.

A system is desired that will allow an electronic payment to be made to all the beneficiaries or stakeholders as payees by providing a platform to initiate an electronic multiple payee payment enabling all payees to receive payments in their individual accounts as agreed. In particular, a system is desired that will allow an electronic payment to be made to all the beneficiaries or stakeholders as payees by providing a platform for electronic endorsements and clearing of multiple payee checks where they all can endorse and receive payments in their individual bank accounts as agreed. A system is also desired that provides a platform for Automated Teller Machines (ATM) to identify and process multiple payee checks. A system is further desired that will allow electronic notification or information sharing of a filed and ongoing insurance claim to the payees or stakeholders of the insurance claim.

Additionally, financial institutions/mortgagee lienholders normally do not know if or when a claim has been filed and do not have instant access to critical claim documents such as the policy in force, building estimates, auto estimates, photos, benefit beneficiaries, etc. These documents have to be requested by the financial institution/mortgagee/lienholder etc. from the claimant and must be faxed or mailed in. A document exchange platform that facilitates the exchange of documents between the parties to a payment or claim, and an information database system is also desired that sits on top of a multiple payee payment system described herein that automatically notifies the financial institution/mortgage comp/lienholder that a claim has been filed and provides them with instant access to certain documents pertaining to a given claim.

Accordingly, there is a need for computer implemented systems and methods for facilitating resolution of multiple payee payment issues when a party/entity wants to pay multiple payees with a single electronic payment transaction and/or to conveniently negotiate a multiple payee check instrument. There is also a need for a payment network and platform that can stand alone as fully integrated network, can be dependent on other payment networks, and/or can operate with existing systems or payment networks (partially integrated). The invention described herein addresses these and other needs in the art.

SUMMARY

The above-mentioned needs in the art are addressed by a system and method that ensures that funds get to multiple payees in a quick, cost effective, safe, and efficient manner. The system may be used by businesses, individuals or government entities that need to send a single payment to multiple payees for whatever reason when their preferred option is not to use a paper check but an electronic payment option. In addition, the system also may be used by businesses, individuals or government entities to easily and remotely negotiate a multiple payee check. Thus, the invention addresses the need for an electronic solution to the multi-payee issue by addressing the issues attendant to electronic payment processing including on-line authentication, endorsement, and notification, as well as multiple debits and deposits. As noted above, there is no analog method in the prior art that permits one to make a single payment to multiple payees in the on-line or off-line world or a system for doing so.

Embodiments of the invention provide a platform that enables direct deposit for entities, such as, without limitation, insurance companies and financial institutions, and to enable a quick and efficient electronic payment of a claim's compensation to a policyholder, claimant or any related party. Embodiments of the invention are implemented in a cloud server based electronic payment network/system that triangulates or enables a payout process for, e.g., insurance claims among the three main parties involved in an insurance claim: the insurance company, the claimant, and the financial institution/lienholder/stakeholder or any other interested party.

Embodiments of the invention further enable/facilitate/implement payment negotiation and settlement of multiple payee checks for insurance claims ranging from auto accidents, health, property damage, business claims, death, workers compensation, etc. Certain industries, such as, without limitation, the insurance industry, are still heavily dependent on paying all insurance claims or payouts manually with a paper check. This tends to be very costly for financial institutions and insurance companies to print, mail, negotiate, and then also to manage the payout process with a staffed "Claims Department" that monitors proper payee endorsements and sets disbursement arrangements. The system described herein automatically performs such functions. For example, exemplary embodiments of the invention provide an alternative electronic payment platform that includes a workflow that enables payee endorsement/verification and disbursement arrangement as/if required. In exemplary embodiments, the system permits a hold to be placed while notification is being initiated and for the hold to be placed on a bank or card account. The system may further enable multiple payee check deposit via ATM and provide means for notifying payees.

Embodiments of the invention further include methods for facilitating payment to multiple payees from a single electronic and/or multiple payee check by performing functions including: initiating multiple payee payment, initiating a multiple payee check handling and clearing process, placing a multiple payee hold on a payor's bank/card account, creating transaction accounts, crediting and debiting the transaction accounts, facilitating the payor specifying the exact amount each payee or stakeholder will receive, facilitating the payor sending payment without specifying the amount each payee or stakeholder will receive, providing multiple payee check deposit via an automated teller machine (ATM), allowing ATMs to identify a multiple payee check for processing, processing a multiple payee check via an ATM, initiating a notification protocol, enabling multiple payee electronic check endorsement, facilitating electronic $3^{rd}$ party payment in the form of "pay to" endorsements, identity verification or authentication, alerting payees that funds are available, enabling payee electronic endorsement/identity verification, receiving payee endorsement/confirmation of business or individual identity, receiving payee electronic check endorsements/confirmation of a business or individual identity, enabling availability of the endorsement file to the payor, providing payment forms to redirect payment from one payee to another, enabling document exchange relating to the payments, providing an electronic check for clearing, debiting a payor's bank/card account from a cleared check, enabling disbursement workflow arrangement, allowing payees to stake out a specific amount from the total payment, allowing payees to agree to each other's stake, confirming that the staked out amounts equate to the payor's total payment amount, lifting the multiple payee hold on the bank/card account after receiving all endorsements/identity verification, forms, and documents, registering a debit to the payor's bank/card account after the hold has been lifted, and crediting the payees bank or card accounts.

Other features of embodiments of the invention described herein further include effecting notification of a payee that funds are available by any one of email, SMS text, phone call, mobile device, social media or network, integration with a payee's platform, and the like. Systems and methods are also provided for enabling electronic payee check endorsement and identity verification and for receiving payee endorsement and identify confirmation. The systems and methods of the exemplary embodiments also create an endorsement file and store endorsements within the endorsement file and may make the endorsement file available to the payor.

In accordance with other exemplary embodiments, payment forms are provided and systems and methods for uploading/exchanging of documents are also provided. Still other embodiments include systems/methods for providing electronic checks for clearing and for enabling disbursement workflow, further including sending the debited funds for disbursement. In exemplary embodiments described herein, the payor's funds may be debited through an automated clearing house or any other electronic payment system.

The system and method described herein may be particularly beneficial for insurance carriers and other businesses where the multiple payees may be any one of a financial institution/mortgagee/lienholder, policyholder/claimant, and/or any other additional stakeholder(s) on the insurance settlement. In such applications, the disbursement arrangement may be between a financial institution/mortgage comp/lienholder and the policyholder/claimant/payees and the funds may be debited through a payment network and deposited based on an agreed disbursement agreement. In other exemplary embodiments, the debited funds may be directly deposited to designated bank accounts and the disbursement may be made to bank accounts, entities or individuals.

In still other exemplary embodiments, a database may be provided that stores data regarding activity and/or data generated as a result of claims, benefits, surrender requests etc. The database may be synchronized with an insurance carrier's database to provide real-time information upon request.

In particular, the invention includes a system for facilitating electronic payment to multiple payees from a single electronic payment transaction and/or from a multiple payee check payment and associated methods and computer readable media containing computer readable instructions for performing such methods. In exemplary embodiments, the system is implemented in a cloud computing setting and includes a database storing payor and payee identity, address, and bank account information, a processor that executes instructions and communicates outputs to a payor and respective payees, and a memory that stores instructions for execution by the processor. When executed, the instructions cause the processor to perform the steps of initiating multiple payee payment and/or a multiple payee check handling and clearing process including determining identity of the payor and/or receiving the payor's check information: receiving identification of multiple payees; placing a hold on a payor's bank/card account and/or accepting multiple payee check deposit via an ATM; alerting respective payees that funds are available; enabling payee electronic check endorsement and/or identity verification for the respective payees; receiving electronic payee endorsement and confirmation of identity and providing an endorsement file to the payor for each payee: debiting the payor's account in respective amounts owed the respective payees; and disbursing the respective amounts to the respective payees through a payment network.

In other exemplary embodiments, the memory further stores instructions that when executed by the processor cause the processor to enable the payor to specify amounts to be paid to each payee and to distribute the specified amounts to each payee in the distributing step. The processor may also be instructed to enable one or more of the multiple payees to specify amounts to be paid to each payee and to redirect payment to each payee in accordance with the specified amounts.

In further exemplary embodiments, placing a hold on the payor's bank/card account comprises placing an account funds hold through the payor's payment/banking network in an amount of total payment to all payees and debiting the payor's account comprises debiting the payor's account in portions based on the amount to be disbursed to each payee. The processor may further be instructed to create a temporary transaction account from which the payor's funds are debited and to which a credit is made in the debiting step.

In the exemplary embodiments, alerting respective payees comprises simultaneously notifying the respective payees of payment availability via a communication network and providing each payee with instructions on how to proceed to collect the payee's funds. Also, simultaneously notifying the respective payees of payment availability may further comprise sending messages to the respective payees by at least one of: email, SMS text, phone call, and integration with a payee's payment platform.

In still other exemplary embodiments, the processor is instructed to create an interface that enables payee electronic check endorsement by prompting each payee to endorse a check image of the multiple payee check whereby each payee is enabled to affix their individual endorsement to a back of the check image. To facilitate endorsements, the processor may make a copy of the check image with endorsements of each payee visible to all payees. The processor may further forward the check image to the payor's bank for clearing once all payees have endorsed the check image.

In yet other exemplary embodiments, the processor provides endorsement forms and/or payment redirection authorization forms to the respective payees and enables exchange of documents including the endorsement forms and/or payment redirection authorization forms among the payor and the respective payees.

In the exemplary embodiments, debiting the payor's account in respective amounts owed the respective payees may comprise lifting the hold on the payor's bank/card account after receiving all endorsements and confirmation of identity for each payee and then debiting the payor's bank/card account after the hold has been lifted. The processor may further implement a workflow arrangement with at least one of the payees that controls disbursement of the respective amounts to the respective payees.

The systems described herein may be standalone (fully integrated) or partially integrated with payment systems such as an automated clearing house through which the payor's funds are debited.

In exemplary embodiments, the payor is an insurance carrier and the payees are any one of a bank/mortgage/lienholder, policyholder/claimant, and any other additional stakeholder(s) on an insurance settlement and the database is synchronized with the insurance carrier's database.

These and other beneficial features and advantages of the invention will become apparent from the following detailed description.

BRIEF DESCRIPTION OF THE DRAWINGS

The above and other objects and advantages of the invention will be apparent to those skilled in the art based on the following detailed description in conjunction with the appended figures, of which.

DETAILED DESCRIPTION OF ILLUSTRATIVE EMBODIMENTS

Exemplary embodiments of an electronic multi-payee payment system are described below with respect to FIGS.

1-15. Those skilled in the art will appreciate that the steps described are for exemplary purposes only and are not limited to the specific process described.

Figure 1:
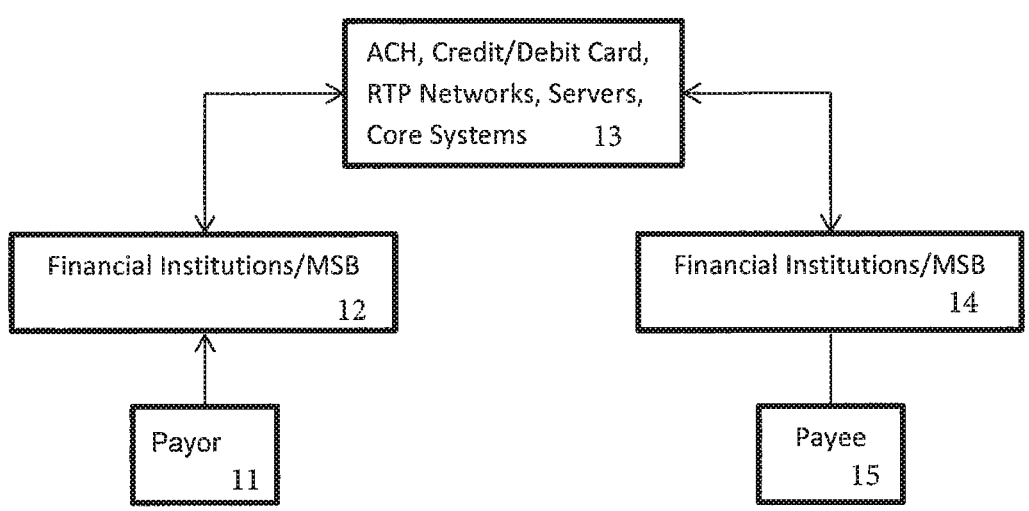
FIG. 1 illustrates a conventional single payee payment system.

FIG. 1 illustrates a conventional single payee payment system 10. As illustrated, a payor 11 uses his/her financial institution or other payment/banking network 12 to initiate an integrated money transfer to a single payee 15 through a payment system 13 such as an automated clearing house (ACH), debit or credit card network, RTP network, etc. The payment system 13 provides payment to a financial institution 14 of the payee 15. In operation, the financial institution/money transmitter 12 collects the payor's funds and processes the single payee payment through the payment or banking networks 13 and payment is provided to the single payee's bank 14. The funds are credited to the payee's account 15. In this system, if the payor 11 needs to pay other payees, the payor 11 uses his/her financial institution 12 to initiate additional transfers for each additional payee 15. In each instance, the financial institution/money transmitter 12 collects the payor's funds and processes the payment for transfer to a single payee. If it is a multiple payee payment that is also a multiple stakeholder payment, then the payment cannot be processed by the system as a paper check will have to be issued. As noted in the background section above, such conventional systems only permit a single payment to a single entity at a time and are very inefficient, particularly for businesses and individuals who routinely pay multiple payees.

Figure 2:
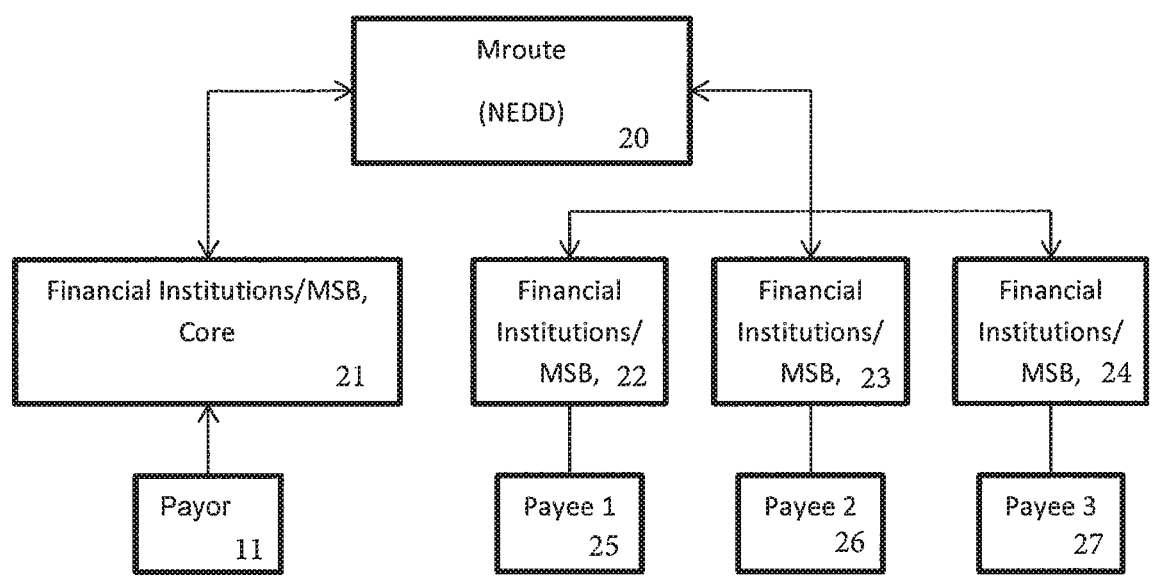
FIG. 2 illustrates a multi-payee payment system of an exemplary embodiment of the invention.

FIG. 2 illustrates a multi-payee payment system of an exemplary embodiment of the invention. In the embodiment of FIG. 2, an Mroute payment system 20 in accordance with the invention processes a multi-payee payment from the financial institution 21 of payor 11 and provides the payees 25-27 the option of choosing a desired account in which to have their individual stake deposited. The Mroute payment system 20 implements the payment to multiple accounts using a NEDD (Notification, Endorsement, Debits, Disbursements) protocol as described herein to process and route funds to the financial institutions 22-24 of multiple payees 25-27. In operation, a credit is made to Payee 1 via the payee's financial institution 22, a credit is made to Payee 2 via the payee's financial institution 23, and a credit is made to Payee 3 via the payee's financial institution 27 in accordance with the processes described in more detail below.

Figure 3:
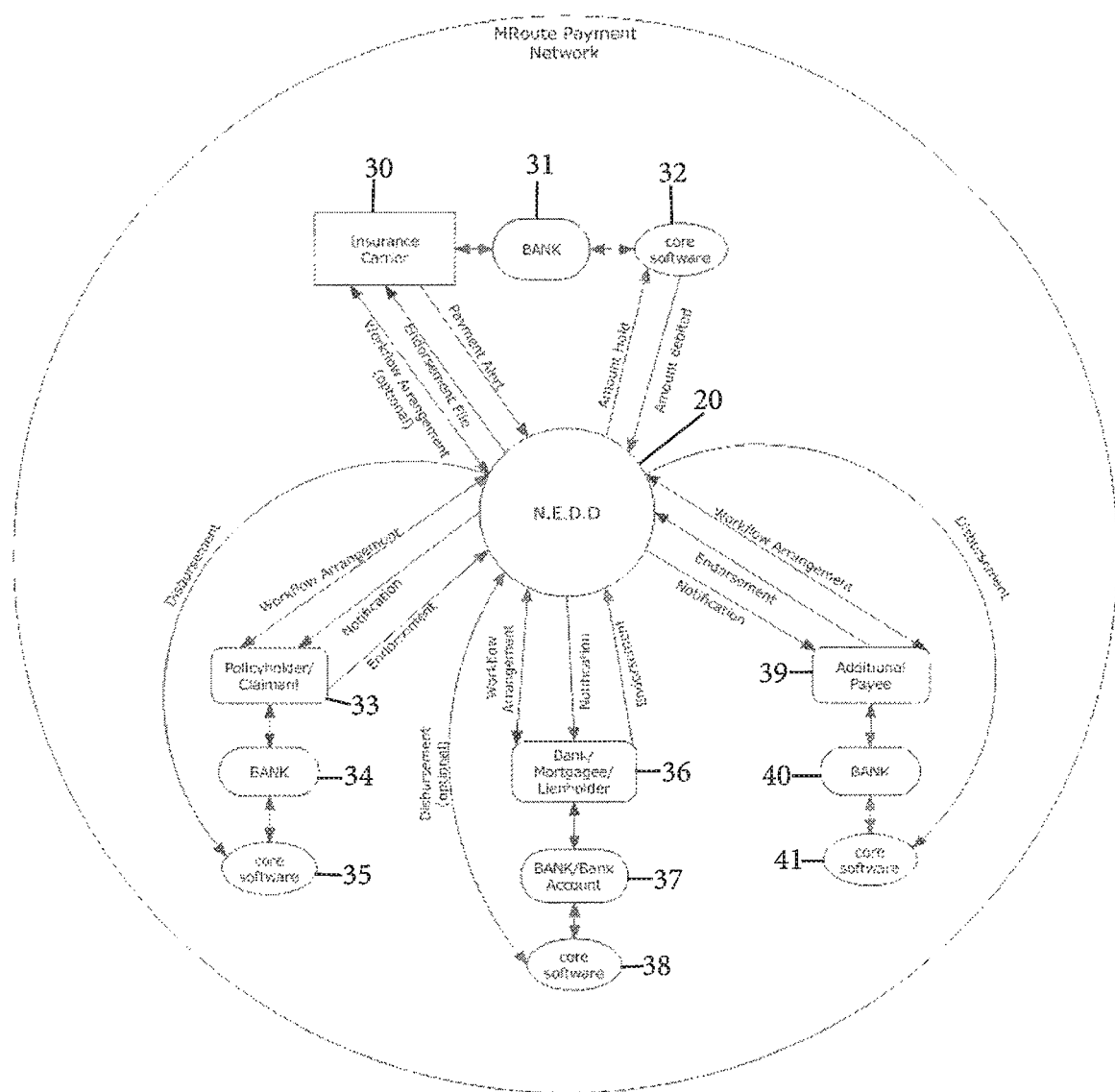
FIG. 3 illustrates a fully integrated multi-payee payment system of FIG. 2 as used to facilitate multiple payments by an insurance carrier.

The Mroute payment system 20 may be used as an integrated (i.e. standalone) system or may be partially integrated (i.e. works in conjunction with another payment system) in many different systems where simultaneous payment to multiple payees is desired. For example, FIG. 3 illustrates a fully integrated multi-payee payment system 20 as used to facilitate multiple payments by an insurance carrier 30. As illustrated, the insurance carrier 30 communicates with the Mroute payment system 20 to provide payment alerts and to receive endorsement files and, optionally, to exchange a proposed workflow arrangement. The insurance carrier's financial institution 31 implements core software (for integration with the Core Financial Software System used by financial institutions) 32 to tell the Mroute payment system 20 how much to debit from each payee account and for the Mroute payment system 20 to specify the amount of funds to hold. The Mroute payment system 20 processes and routes the multiple payments to the respective payees as disbursements. As shown, the payees may include the policyholder/claimant 33 that receives payment notifications and provides endorsements to the Mroute payment system 20 for the amounts disbursed to the policyholder/claimant's bank 34 using core software 35. Other payees may include a bank/mortgagee/lienholder 36 of insured property that receives payment notifications and provides endorsements to the Mroute payment system 20 for the amounts disbursed to the bank/mortgagee/lienholder's bank 37 using core software 38, as well as additional payees 39 that receive payment notifications and provide endorsements to the Mroute payment system 20 for the amounts disbursed to the payee's bank 40 using core software 41. The policyholder/claimant 33, bank/mortgagee/lienholder 36, and payee 39 may optionally develop a workflow arrangement with the Mroute payment system 20 as illustrated.

Figure 4:
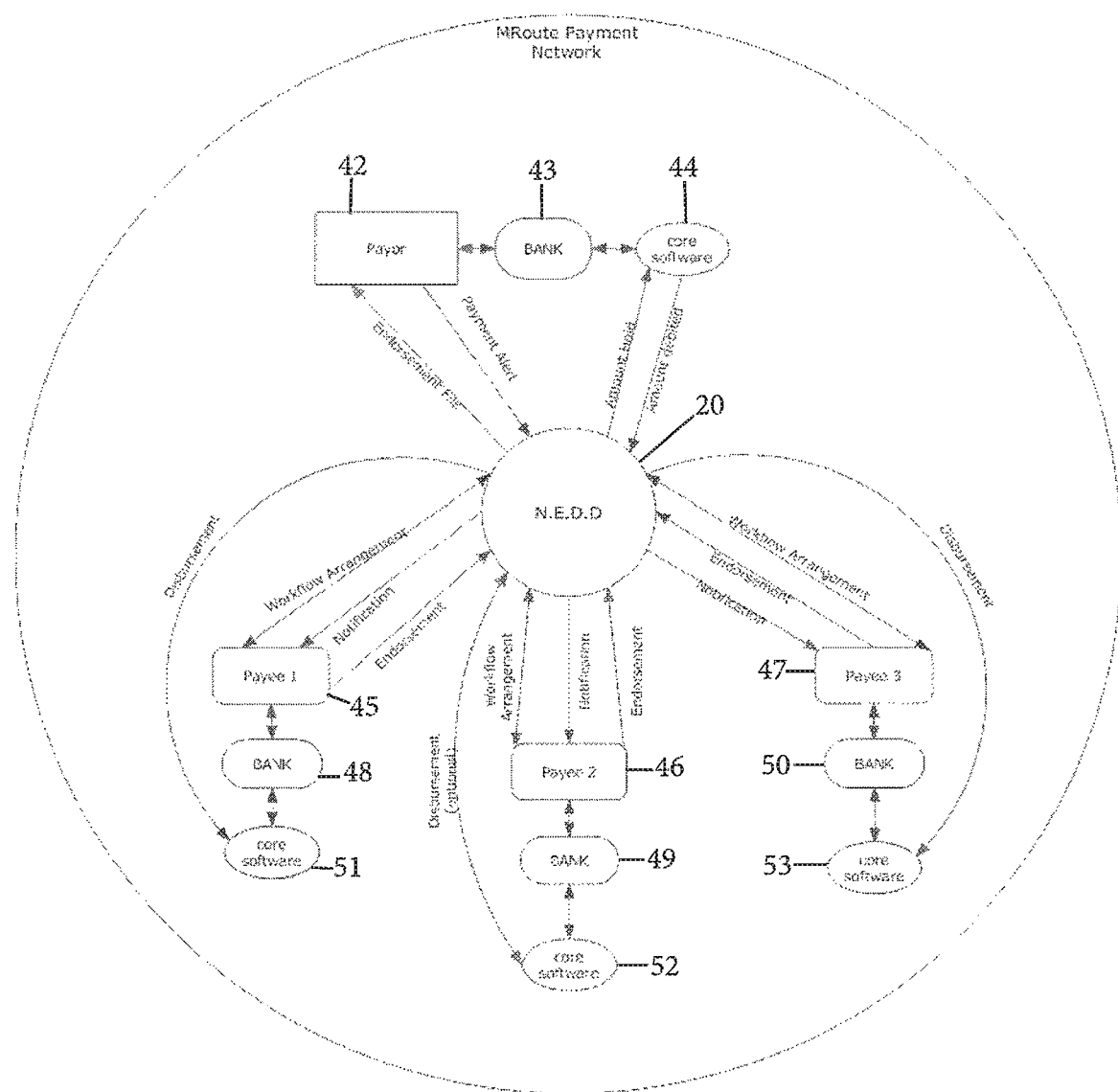
FIG. 4 illustrates a fully integrated multi-payee payment system of FIG. 2 as used to facilitate multiple payments by a payor.

FIG. 4 more generally illustrates a fully integrated multi-payee payment system 20 as used to facilitate multiple payments by a payor. As illustrated, the payor 42 communicates with the Mroute payment system 20 to provide payment alerts and to receive endorsement files. The payor's financial institution 43 implements core software 44 to tell the Mroute payment system 20 how much to debit from each payee account and for the Mroute payment system 20 to specify the amount of funds to hold. The Mroute payment system 20 processes and routes the multiple payments to the respective payees as disbursements. As shown, the respective payees 45-47 receive payment notifications and provide endorsements to the Mroute payment system 20 for the amounts disbursed to the respective payee's banks 48-50 using respective core software 51-53. The respective payees 45-47 may optionally develop a workflow arrangement with the Mroute payment system 20 as illustrated.

Figure 5:
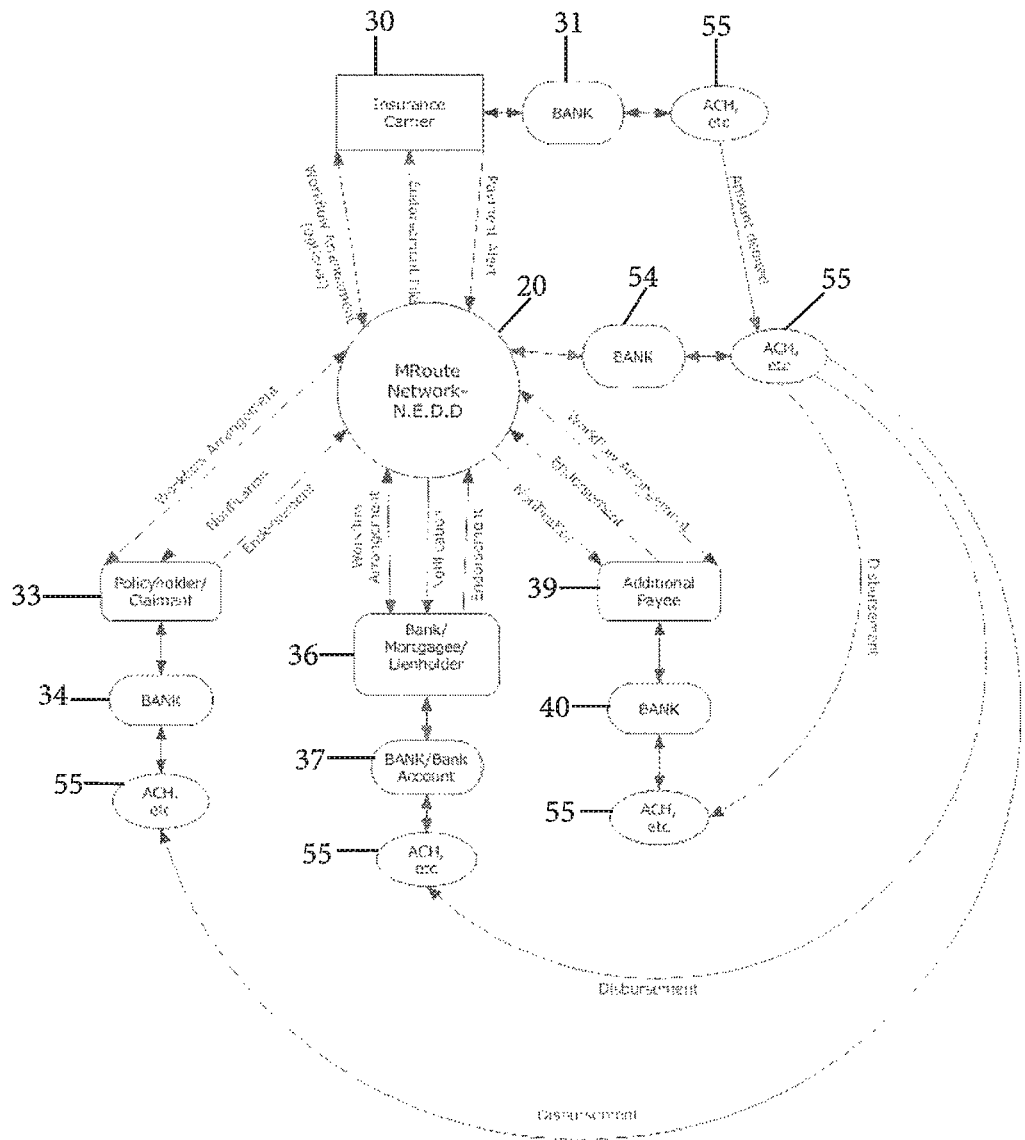
FIG. 5 illustrates a partially integrated third-party multi-payee payment system as used to facilitate multiple payments by an insurance carrier in the context of a conventional ACH payment system.

FIG. 5 illustrates an embodiment of a partially integrated third-party multi-payee payment system 20 as used to facilitate multiple payments by an insurance carrier 30. In this example, the multi-payee payment system 20 is partially integrated with a conventional ACH payment system that provides ACH payment via the respective financial institutions of each party. In this example, the multi-payee payment system 20 further includes its own bank 54 for facilitating ACH payment. Also, instead of core software for facilitating communications as in FIG. 3, each financial institution 31, 34, 37, 40, and 54 in the system implements conventional ACH transfers or other conventional single payee transfer payment using ACH system 55.

Figure 6:
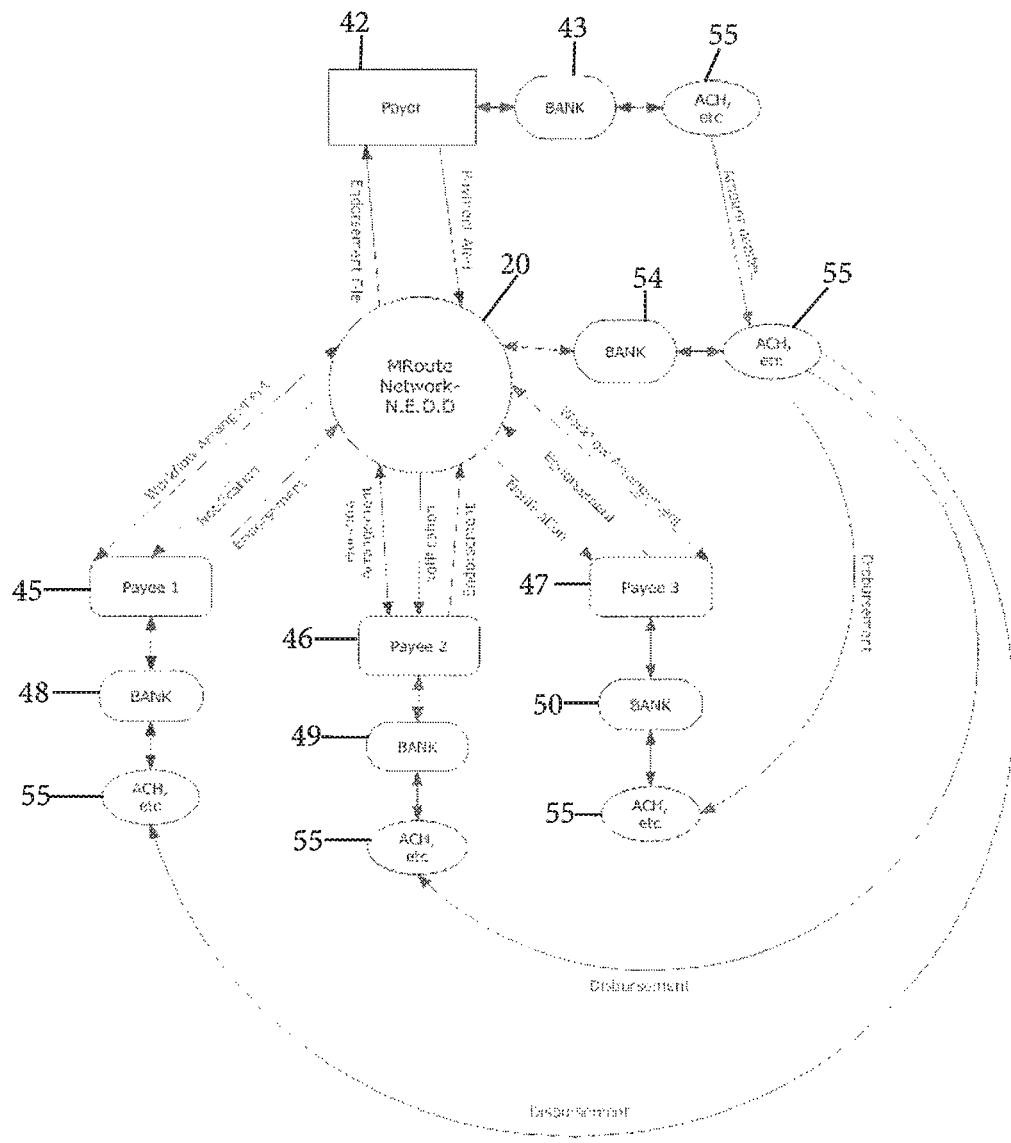
FIG. 6 illustrates a partially integrated third-party multi-payee payment system as used to facilitate multiple payments by a payor in the context of a conventional ACH payment system.

FIG. 6 illustrates an embodiment of a partially integrated third-party multi-payee payment system 20 as used to facilitate multiple payments by a payor 42. This example also partially integrates the multi-payee payment system 20 with a conventional ACH payment system that provides ACH payment via the respective financial institutions of each party. In this example, the multi-payee payment system 20 further includes its own bank 54 for facilitating ACH payment. Also, instead of core software for facilitating communications as in FIG. 4, each financial institution 43, 48, 49, 50, and 54 in the system implements conventional ACH transfers or other conventional single payee transfer payment using ACH system 55.

An embodiment of the invention in a full integration standalone operation contemplates implementation of a NEDD (Notification, Endorsement, Debits, Disbursements) protocol in the Mroute payment system 20. In particular, a processing platform, preferably placed in the cloud (FIG. 15), processes software for implementing the NEDD protocol described herein whereby a payor (insurer/business entity/individual/government entity) may make a multiple payee or stakeholder electronic payment. The fully integrated Mroute payment system 20, once engaged, initiates a chain of events that is structured on a queue based architecture design, but can also be based on other design architecture. The structured events are described in more detail below with respect to FIGS. 7-14.

In the exemplary embodiments described below with respect to FIGS. 7-14, once a single electronic transaction payable to more than one payee is initiated by a preregistered user or account holder of a preregistered user, the Mroute payment system 20 initiates a multiple payee bank account hold on the payor's bank or card account. The hold allows the bank account to be debited multiple times based on the number of payees and further initiates the notification (N) part of the NEDD protocol. Notification of available funds may be sent by way of an email, SMS text, phone call, mobile device, by integrating with a payee's platform if the payee is a business, etc. Payees may then be alerted that funds are available and their endorsement verification is required to proceed.

The Mroute payment system 20 may also initiate a multiple payee check handling and clearing process. In this case, a preregistered user manually inputs payee information from a check or remotely captures with a camera or other device the fields of the check with payee names on the check. The Mroute payment system 20 captures the fields and requests name confirmation of the payees from the user and populates an email or cell phone number field for the user to input the information of each payee. Upon entry, the Mroute payment system 20 sends payment notifications to all the payees while simultaneously placing a hold on the check issuer's bank account. The information is stored in a database where each transaction is mapped to a payer and payees.

The embodiments of the invention described with respect to FIGS. 7-14 further enable each payee to electronically verify their business or individual identity if the payment is as a result of an initiated multi-payee transaction and not from a paper check instrument. Upon identity verification, the multiple payee held funds are debited by the Mroute payment system 20 and credits of different amount are made to the payees. On the other hand, if the payment was initially in the form of a multi-payee paper check, then the system will follow steps that involve sending each payee an electronic image of the check. The payees will be provided an interface to remotely input their signature endorsement to the back of the remotely captured check image. The embodiments described herein further provide the ability to accept multiple remotely captured endorsements from various payees and place it on the endorsement section (back of check) of a remotely captured check image. This is the endorsement (E) part of the NEDD protocol and it allows all the stakeholders to sign off on the payment. Once all payees have properly endorsed as per the payor's specifications, the endorsement file is stored or made available to the payor for their records. Endorsements can also be in the form of identification verification for individual or business entity payees.

In a situation where not all the payees are entitled to a portion of either an initiated or converted (from a paper check instrument) multi-payee payment, then a payment form is provided to a payee. Payment forms provide a different type of endorsement and can be custom statements provided by the payer where payee must agree to the terms and endorse. The language involves a simple payment redirection request, where a payee intends not to accept/receive any funds but redirects the total amount to other payee(s). For example, in an insurance claim where policyholders' contractors are payees on a payment, the policyholder will usually need to endorse the full payment over to the contractor. A payment form enables total funds redirection to any of the other payees.

After all endorsements are gathered, the hold on the payor's funds in their bank account is lifted and the funds are debited (D), which is the debit (D) part of the NEDD protocol. The debited funds are disbursed as specified by the payor to the payees or stakeholders. The system thus enables a single payor to specify a single electronic transaction not be designated to just a single payee as is the norm, but to be designated to multiple payees.

Unspecified multi-payee payments are payments where the initiator or payer does not specify the amounts to disburse to each payee. Upon payee notification of pending funds for collection, the system deploys a channel that allows each payee to the transaction input a desired amount as a fraction of the total payment. The payees are provided with the option to all agree to each other's desired amount. The system will then verify that the payees' desired amounts all add up to the total payment's initial amount. This feature allows for payees deciding what they each receive when a payor does not specify an exact amount to disburse to the payees. The debited funds are paid out based on a disbursement (D) arrangement as specified and agreed by the payees involved through a web interface according to an embodiment of the invention. The disbursement arrangement is the disbursement (D) part of the NEDD protocol and concludes when the funds are deposited into the various payee bank accounts as requested/required. The disbursement arrangement also can involve a customized workflow that allows the upload/exchange of documents.

A workflow arrangement is the workflow (steps) that can be involved in the disbursement arrangement, i.e., the disbursement arrangement workflow. The disbursement arrangement workflow is the required steps/documents that a payor can/will require before disbursements can occur. For example, an insurer or financial institution/lienholder will require a law firm to produce paperwork before it can get its fee after negotiating a settlement. The requested paperwork can include a contract between one or more operators of the system with their policyholder or customer that indicates the amount of such operator's fee so they know what to pay the operator from the negotiated settlement. Also, the requested paperwork may include an affidavit of lien removal to ensure the operator accepts that it has been paid in full and will not place a lien on the property. The requirements (workflow arrangement) will differ from payor to payor and can be based on their various arrangements.

In situations where a multiple payee check is in play, the system can handle and negotiate the check remotely and settle all the payees electronically. A remote multiple payee check can be done directly with the system or via ATM deposits.

Embodiments of the invention in a partial integration non-standalone operation integrate with existing 3rd party payment systems that financial institutions currently use such as ACH (automated clearing house), etc. Where the complete system is not utilized or needed by a business or individual, and partial integration may be preferred, the following steps may apply in the operation. Once a payment is initiated, a notification (N) is sent out to the various payees. The notification can be sent by any of an email, SMS text, phone call, mobile device, or by integrating with a payee's platform if they are a business. All payees are alerted that funds are available and their endorsement is required to proceed.

The invention further enables each payee to endorse (E) the electronic payment after they have received the notification, thereby allowing all stakeholders to sign off on the payment. Once all payees have properly endorsed as per the payor's specifications, the endorsement file is made available to the payor for their records. After all endorsements are gathered and forwarded, the payor's funds may then be debited (D) from their bank account through the ACH or any other electronic payment system. The debited funds may then be available for the disbursement (D) arrangement as specified and agreed to by the parties involved through a web interface. The disbursement arrangement concludes when the funds are deposited into the various payee bank accounts as requested/required. In exemplary embodiments, the disbursement arrangement can involve a customized workflow that allows the upload/exchange of documents.

In insurance claims, benefits, annuities and surrenders, fully integrated applications of the invention may apply the above-described NEDD protocol steps, but may be implemented as follows. For P/C insurance claims, once a payment is initiated according to an embodiment of the invention, it places a hold on the payout amount in the insurance carrier's designated bank account. A notification (N) is sent out to the payees including the bank/mortgagee/lienholder, policyholder/claimant, and any other additional stakeholder(s) on the insurance settlement. After the notification (N) and endorsement (E) portion is done, the hold on the insurance carrier's funds in their bank account is lifted and the funds are debited (D) from the bank account. The funds may then be sent directly to the designated bank account of the bank/mortgagee/lienholder, etc. After these steps are completed, the disbursement (D) arrangement is between the bank/mortgage comp/lienholder and the policyholder/claimant/payees. The disbursement arrangement workflow may be customized based on the requirements of the bank/mortgagee/lienholder and allows the upload of documents or contracts with the 3rd party payees.

For L/H insurance claims or surrenders, the funds are debited through the Mroute payment system 20 and deposited based on the agreed disbursement arrangement. The funds are deposited directly into the designated bank accounts of the beneficiaries.

In insurance claims, benefits, annuities and surrenders, partially integrated applications of the invention implement the following operations. For P/C insurance claims, after the notification (N) and endorsement (E) portion is done, the funds are debited (D) through 3rd party payment systems like the ACH, etc., from the insurers designated bank account and deposited directly to the designated bank account of the receiving bank/mortgage comp/lienholder. After these steps are completed, the disbursement (D) arrangement is between the bank/mortgage comp/lienholder and the policyholder/claimant/payees. The disbursement arrangement workflow can be customized based on the requirements of the bank/mortgagee/lienholder and allows the upload of documents. With the disbursement workflow, other payees/stakeholders, not the policyholder or claimant, are able to claim their share based on their portion of the payment.

For L/H insurance claims or surrenders, the funds are debited through 3rd party payment systems like the ACH, etc., and deposited based on the agreed disbursement arrangement with the disbursement workflow to the designated bank accounts of the beneficiaries.

The invention further includes a database in conjunction with a processor to gather relevant information about claims, benefits, annuities and surrenders from insurance carriers once an insurance claim, benefit, surrender request is made. The information may be accessible to the stakeholders and can include mortgagees, lienholders, policyholders, claimants, etc. The database synchronizes with the insurance carrier's database and provides real time information upon request. This eliminates risks and delays for the banks/mortgage company/lienholder as they now have access to pertinent information that will lead to a faster insurance settlement.

The system platform can also be integrated in even smaller parts. Certain operations can be implemented in mini parts. For example, an insurer may implement the complete NEDD protocol (or some aspects of it) directly with their policyholders or claimants. In such case, a disbursement and workflow arrangement can also occur directly between an insurer and multiple policyholders/claimants, and not only when banks/mortgagees/lienholders etc. are involved. The same setup may be used for banks/mortgage comps/lienholders. They can also implement only certain aspects of NEDD protocol as they see fit. For example, a bank can choose to only implement the workflow arrangement and disbursement aspects of NEDD, and the platform of the invention will accommodate them.

A software embodiment for implementing the fully integrated and partially integrated Mroute payment system 20 in accordance with the invention will now be described with respect to FIGS. 7-14.

Figure 7:
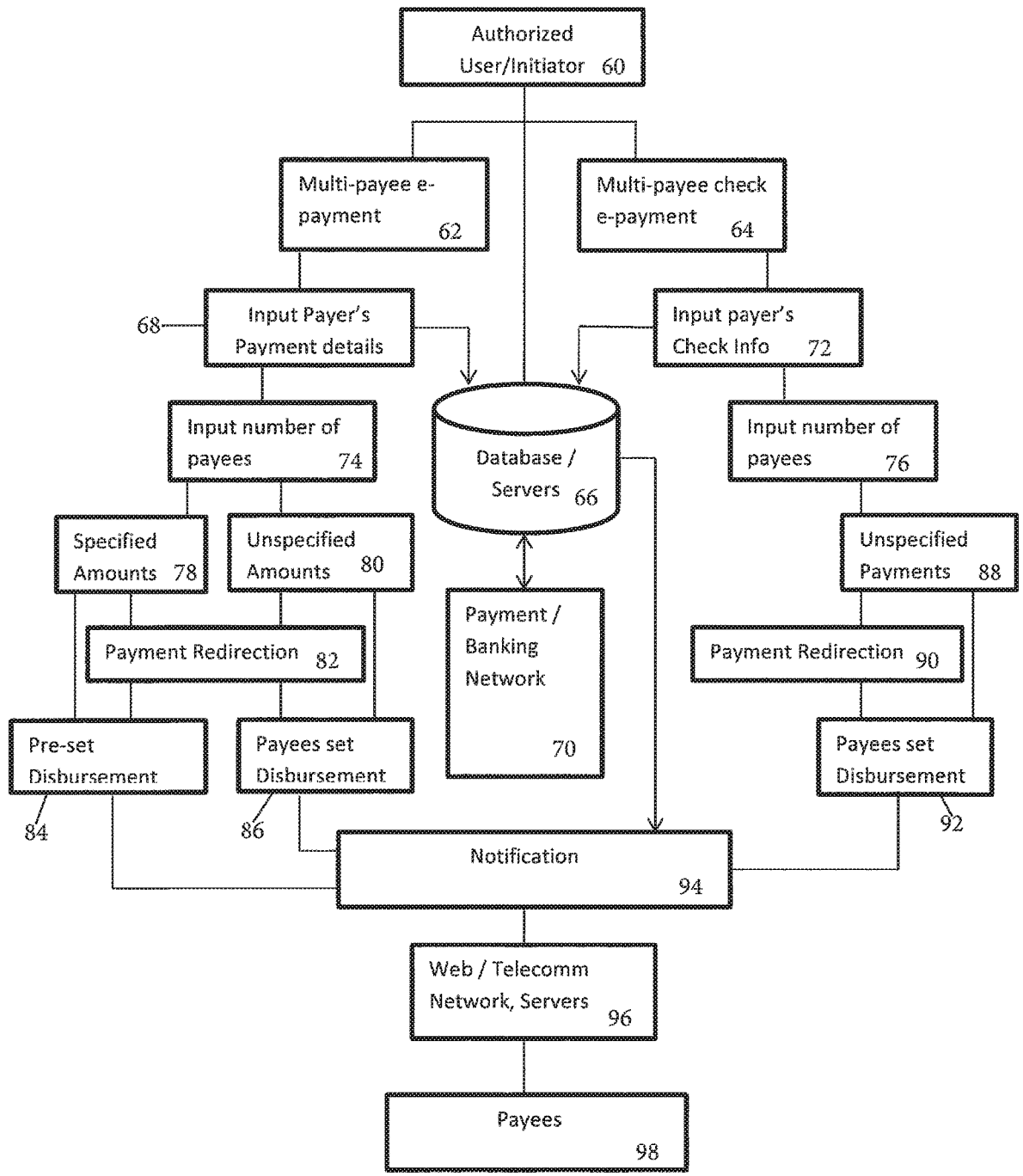
FIG. 7 illustrates multi-payee e-payment and multi-payee check e-payment in an exemplary embodiment.

FIG. 7 illustrates multi-payee e-payment and multi-payee check e-payment in an exemplary embodiment. As illustrated, an authorized user or initiator, who can be a preregistered user, any payer or a payee of a multi-payee e-payment, accesses the system at 60. The user/initiator may initiate a multi-payee e-payment at 62, or initiate a multi-payee check e-payment at 64. If multi-payee e-payment is initiated at 62, the payor's payment details are input into database 66 at 68. The payor's payment information such as name, payment amount, account and routing number, and credit card information is stored in the database 66, or retrieved from the database 66 if previously stored or integrated. A multi-payee account hold is placed on the payer's funds through the payment/banking network or financial institution's core system 70. On the other hand, if the user/initiator initiated multi-payee check e-payment at 64, then information from the payor's check is retrieved from a scanned or remotely captured check copy information and input into the database 66 at 72. A multi-payee account hold is placed on the payor's funds through the payment-banking network or financial Institution's core system 70.

In the case of initiation of a multi-payee e-payment, the authorized user selects two or more designated payees to proceed at 74. On the other hand, in the case of initiation of multi-payee check e-payment, the authorized user selects two or more designated payees to proceed at 76. Based on stored database information, the payor's funds from a multi-payee e-payment or a multi-payee check e-payment is either debited or placed on hold through the banking network/servers 70.

At 78, the authorized user specifies the exact amount to disburse to each payee, or else the system proceeds without specified amounts at 80. Optional payment redirection at 82 allows a payee to redirect all funds to one or more of the other payees. Next, the funds are either distributed according to a pre-set disbursement at 84, or the payees may each select a particular stake in the total payment at 86. In such case, each payee must be in agreement of each other's stake and the total agreed amounts cannot exceed the total lump sum payment from the payor. Similarly, in the case of multi-payee check e-payment, the system proceeds without specified amounts at 88. Optional payment redirection at 90 allows a payee to redirect all funds to one or more of the other payees. Next, the payees may each select a particular stake in the total payment at 92. In such case, each payee must be in agreement of each other's stake and the total agreed amounts cannot exceed the total lump sum payment from the payor.

Payers' payment request or options are mapped/linked to the payees within the database and a notification based on the payer's payout preferences is sent to all payees at 94. In a situation where a payee as authorized user initiates the check e-payment process, that payee also gets a notification. Notifications are sent through the internet or telecomm network or via onsite servers at 96. The payees receive notifications and begin the endorsement/authentication process at 98.

Figure 8:
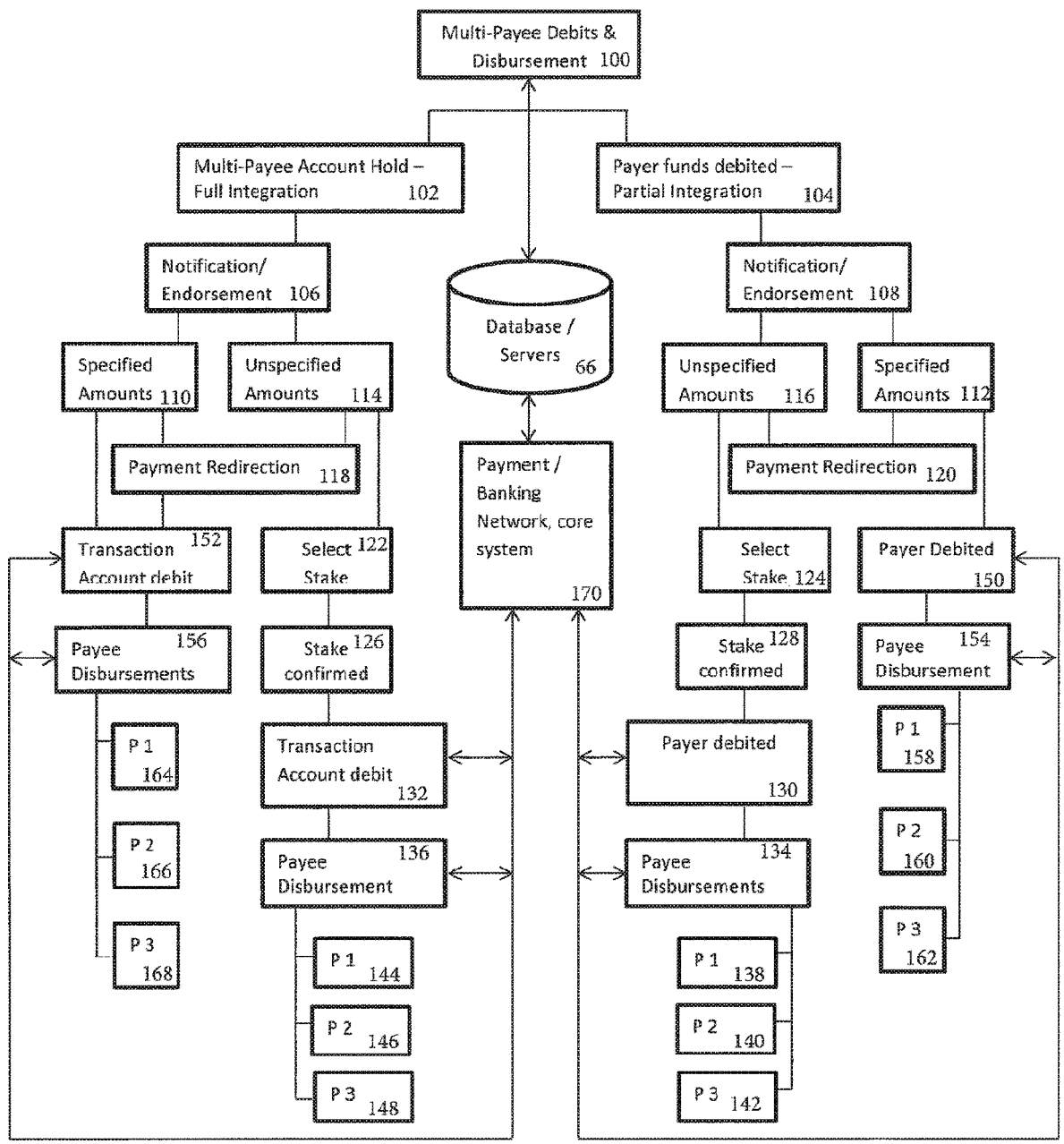
FIG. 8 illustrates multi-payee e-payment debits and disbursements in an exemplary embodiment.

FIG. 8 illustrates multi-payee e-payment debits and disbursements in an exemplary embodiment. In this embodiment, multi-payee debits and disbursements are processed at 100 after retrieving information from the database 66. With full integration, the payor's funds are placed on hold at 102 and the account hold protocol is enabled. On the other hand, with partial integration, the payor's funds are debited at 104. In each case, the notification and endorsement/authentication protocol is enabled at 106 and 108 and the payor specifies various amounts from the total payment to be disbursed to the payees at 110 or 112. In other cases, the payor does not specify amounts from the total payment to be disbursed to the payees (at 114 and 116). Payees have the opportunity to choose an amount from the total and, optionally, the payee may initiate a payment redirection request that allows a payee to redirect a stake from the total payment at 118 and 120. The transaction account process allows all payees to select at 122 or 124 a stake that is equal to the total payment from the payor. The stake is confirmed at 126 or 128, and the payor is debited at 130 or the payees' disbursement begins after the transaction account is debited at 132. The system confirms all payees are in agreement with each other's stake at 134 and 136. If not in agreement, the system allows the payees to reenter a stake until all the payees are in agreement. The system confirms the total payees agreed stake is equal to the total payment from the payor, and the funds are disbursed to the respective payees at 138-148. Similarly, if the payor enters specified amounts at 110 or 112, the payor is debited at 150 or the payees' disbursement begins after the transaction account is debited at 152. The system confirms all payees are in agreement with each other's stake at 154 and 156. If not in agreement, the system allows the payees to reenter a stake until all the payees are in agreement. The system confirms the total payees agreed stake is equal to the total payment from the payor, and funds are disbursed to the respective payees at 158-168. The debits and credits are processed through the payment networks, core systems at 170, and all transaction information is stored in the database 66.

Figure 9:
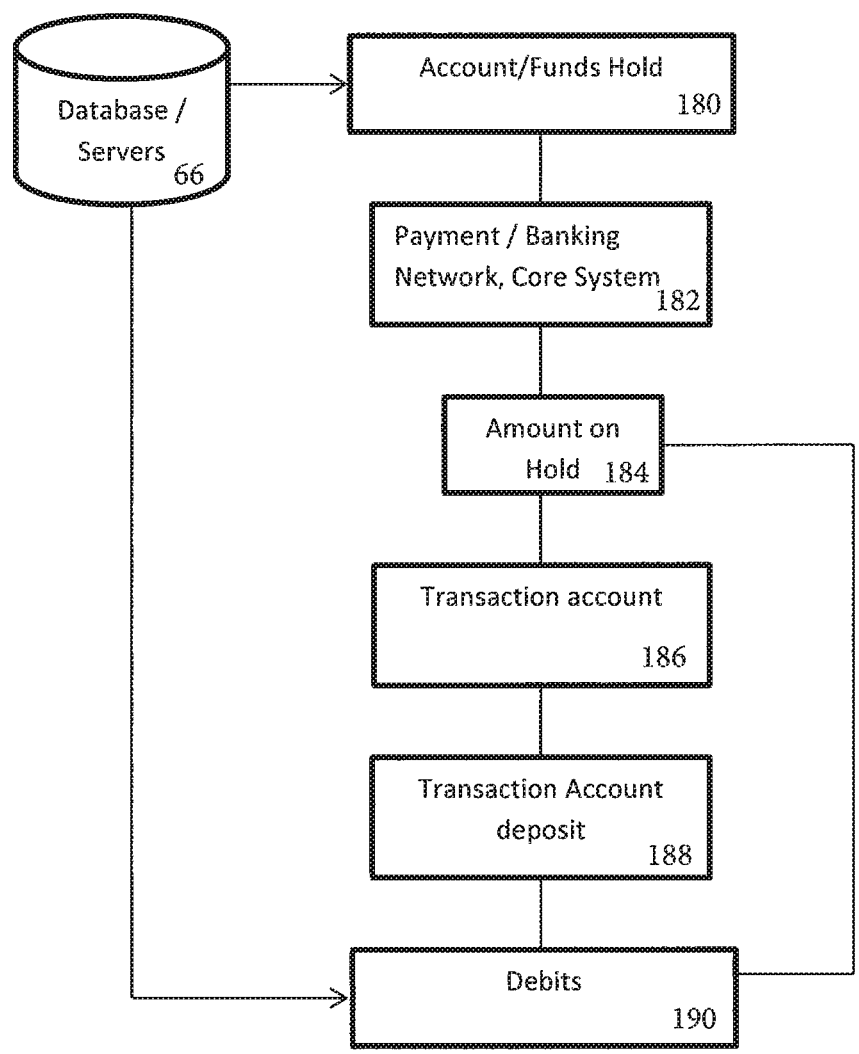
FIG. 9 illustrates fully integrated multi-payee account hold in an exemplary embodiment.

FIG. 9 illustrates fully integrated multi-payee account hold in an exemplary embodiment. As described above, the payor's account information is stored in the database 66. Once a multiple-payee e-payment is initiated, a multiple-payee account/funds hold process begins at 180. The system requests/places an account/funds hold through the payment/banking network, core system at 182. The payor's exact payment amount is placed on hold at 184, but the debits are in portions based on the amount to be disbursed to a payee. The system also creates a temporary transaction account just for the transaction at 186. The payor's funds are debited and a credit is made to the transaction account at 188. The system tags each payee with each payees' exact amount. The amount on hold is debited in portions or the transaction account is debited in portions per database input at 190.

Figure 10:
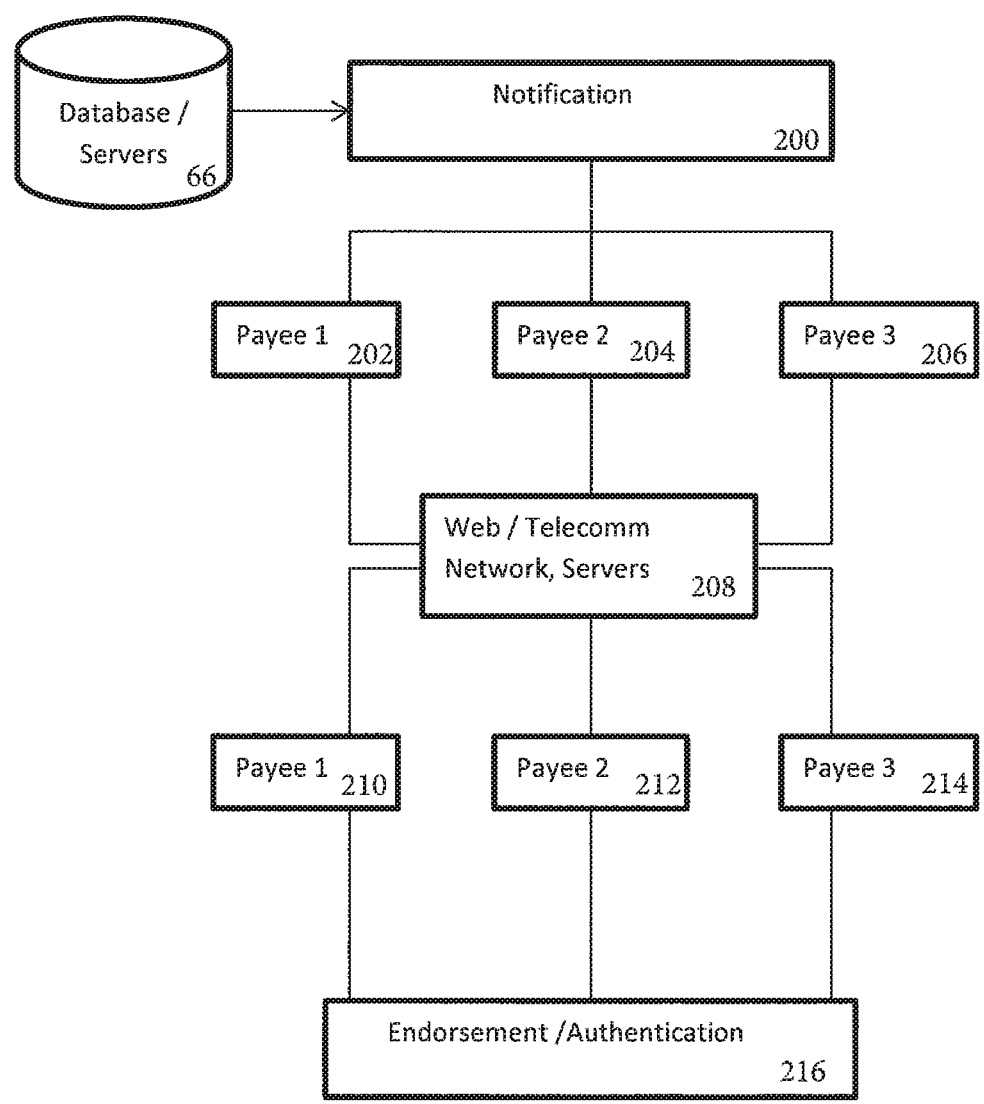
FIG. 10 illustrates multi-payee payment notification in an exemplary embodiment.

FIG. 10 illustrates multi-payee payment notification in an exemplary embodiment. The multi-payee payment instructions are stored in database 66. Payees are simultaneously notified of payment availability per authorized user input and payment instructions at 200. FIG. 10 shows notification to three payees 202, 204, and 206. A specific payment notification is prepared for each payee based on authorized user input that has been stored in database 66. Notification is sent to the payees via existing networks 208 to their contact information stored in the database 66. Each payee receives a payment notification with web link/instructions on how to proceed to collect funds at 210, 212, and 214. The procedure to collect funds might differ from one payee to the next. At step 216, payees are directed to endorse/authenticate payment and to provide identification before disbursements are made.

Figure 11:
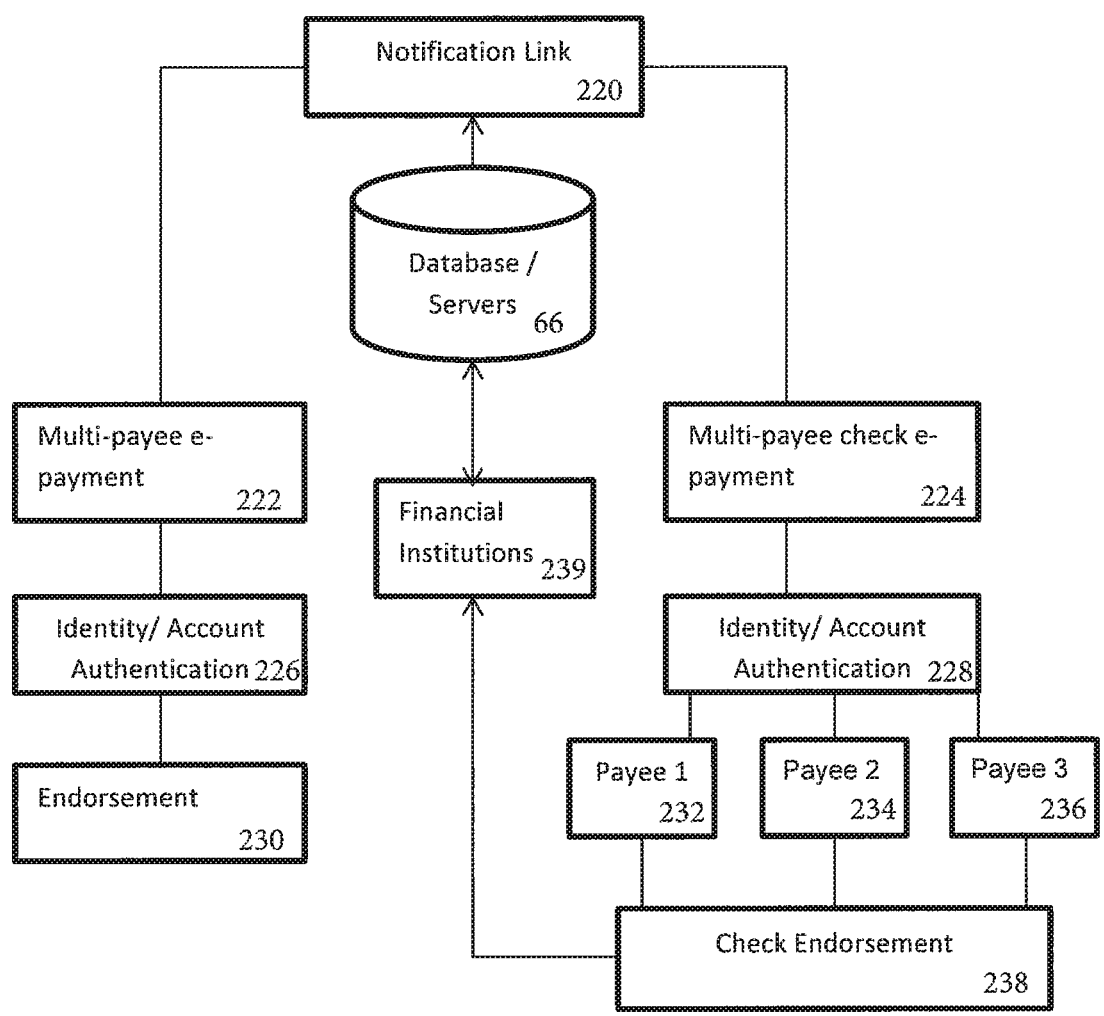
FIG. 11 illustrates multi-payee payment endorsement and authentication in an exemplary embodiment.

FIG. 11 illustrates multi-payee payment endorsement and authentication in an exemplary embodiment. As illustrated, each payee receives a payment notification link at 220 that is tagged to the specific preprogrammed disbursement requirement/information passed through from the database 66. Payment is initiated as a multi-payee e-payment at 222 or payment is initiated as a multi-payee check e-payment at 224. Each payee's identification is individually authenticated at 226 or 228. An optional endorsement for payees is provided at 230. Upon authentication at 228, each payee is prompted to endorse a copy of the check at 232, 234, and 236. A copy of the check is provided to each payee through an interface at 238. The check image is looped through each payee interface and each payee is able to remotely affix their individual endorsement to the endorsement section on the back of the check image. The system uses a real time image that enables the copy of the check update in real time after a payee endorses. The real time check endorsement updates are visible to all the payees so each payee can see that a fellow payee has endorsed the check. A "payable to" $3^{rd}$ party endorsement is also affixed to the check's endorsement section. All payees' endorsements are aligned and the check image is forwarded to the payor's bank for clearing at 239, and the transaction information is stored in the database 66.

Figure 12:
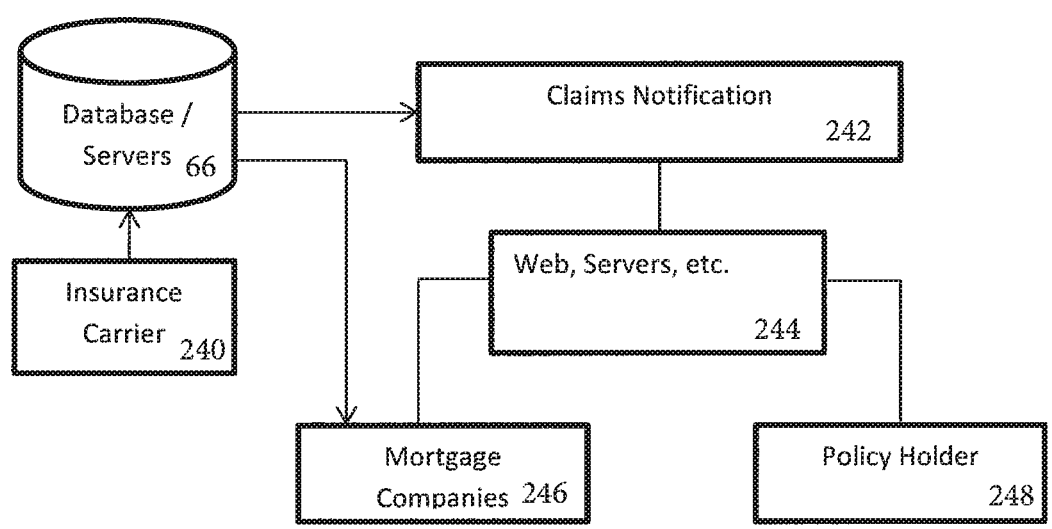
FIG. 12 illustrates multi-payee payment notification for insurance claims in an exemplary embodiment.

FIG. 12 illustrates multi-payee payment notification for insurance claims in an exemplary embodiment. In this embodiment, insurance carriers 240 send claims information to the database 66. Such information includes the claim number, the policy number, claim amount, estimate, contractor's lien waiver, etc. The claims information is sent to the claims notification 242 from the database 66. There, the information is sorted and each claim is tagged by the claim number. The claims notification system 242 retains structured claims information that is ready to be accessed. As illustrated, the claims notification system 242 provides notices via web/servers, etc. at 244. Mortgage companies, financial institutions, finance companies, etc. may access the claim information directory via integration or indirectly at 246. Policyholders and/or claimants cannot access claim information via integration, only indirectly at 248.

Figure 13:
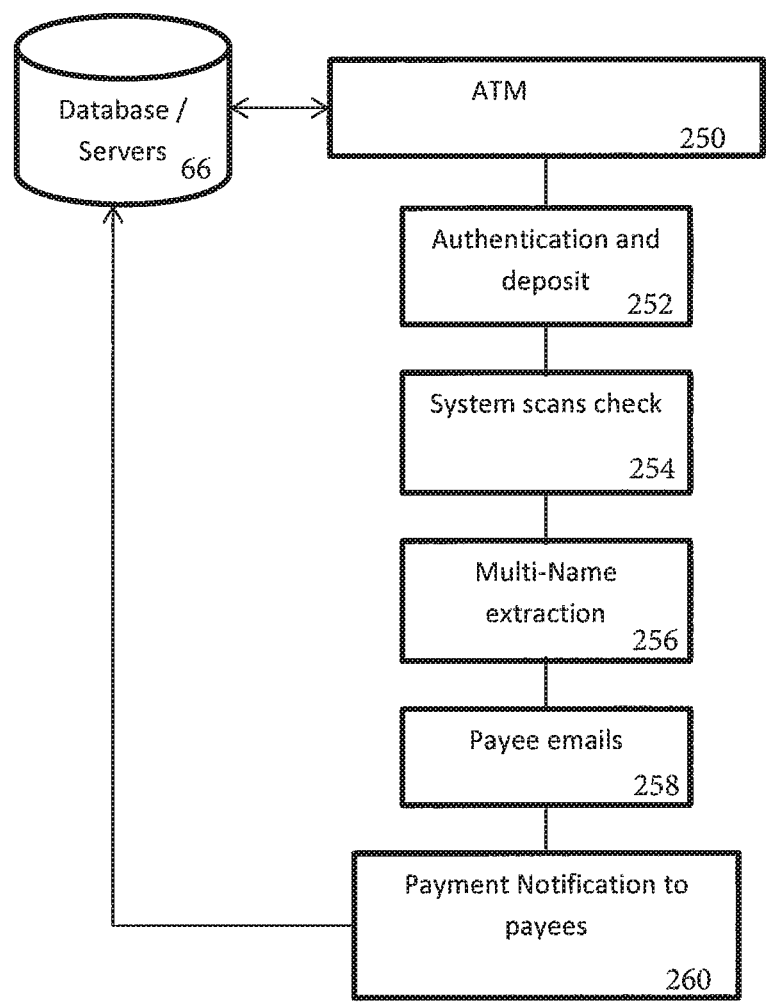
FIG. 13 illustrates an ATM multi-payee check deposit in an exemplary embodiment.

FIG. 13 illustrates an ATM multi-payee check deposit in an exemplary embodiment. As illustrated, a payee on a multiple payee check deposits the check through the ATM at 250. The payee authenticates the bank account and slides the check into ATM at 252. The system scans the check at 254 and identifies/extracts the names of the payees using, for example, optical character recognition techniques, or requests the depositor type the payee names at 256. All payee emails are entered, including the depositor at 258. Payment notification goes out to the payees at 260, and the transaction information is stored in the database 66.

Figure 14:
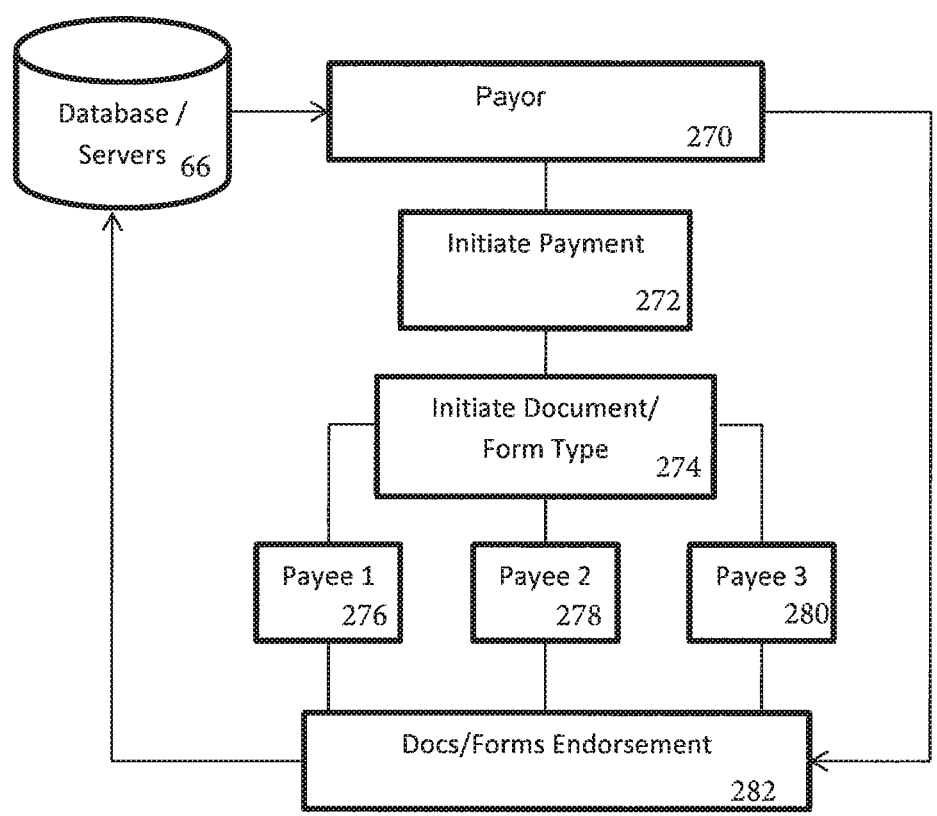
FIG. 14 illustrates a document exchange process in an exemplary embodiment.

FIG. 14 illustrates a document exchange process in an exemplary embodiment. As illustrated, the payor initiates a multi-payee payment at 270. The payment is initiated with options at 272, and the payor opts for document request/exchange with payees and is able to select from the documents or forms template, customize it or upload one at 274. The payor/payee documents exchange is continuous and can span various payment cycles. All payees are linked to the documents and they are able to remotely endorse as requested, or receive revised versions at 276, 278, and 280. The documents/forms are stored in the database 66 and are forwarded to the payor at 282.

Those skilled in the art will appreciate that implementation of the methods described herein may be effected by use of a server, processor, or other computer program product. Those skilled in the art also will appreciate that the systems and methods described herein address problems with convention electronic payment systems that require only one payment to be made at a time. The system described herein provides a system and method for multi-payee debits and disbursements as well as mechanisms for authenticating and notifying the payees and providing for multi-payee endorsements, thereby addressing unaddressed issues in the art.

Figure 15:
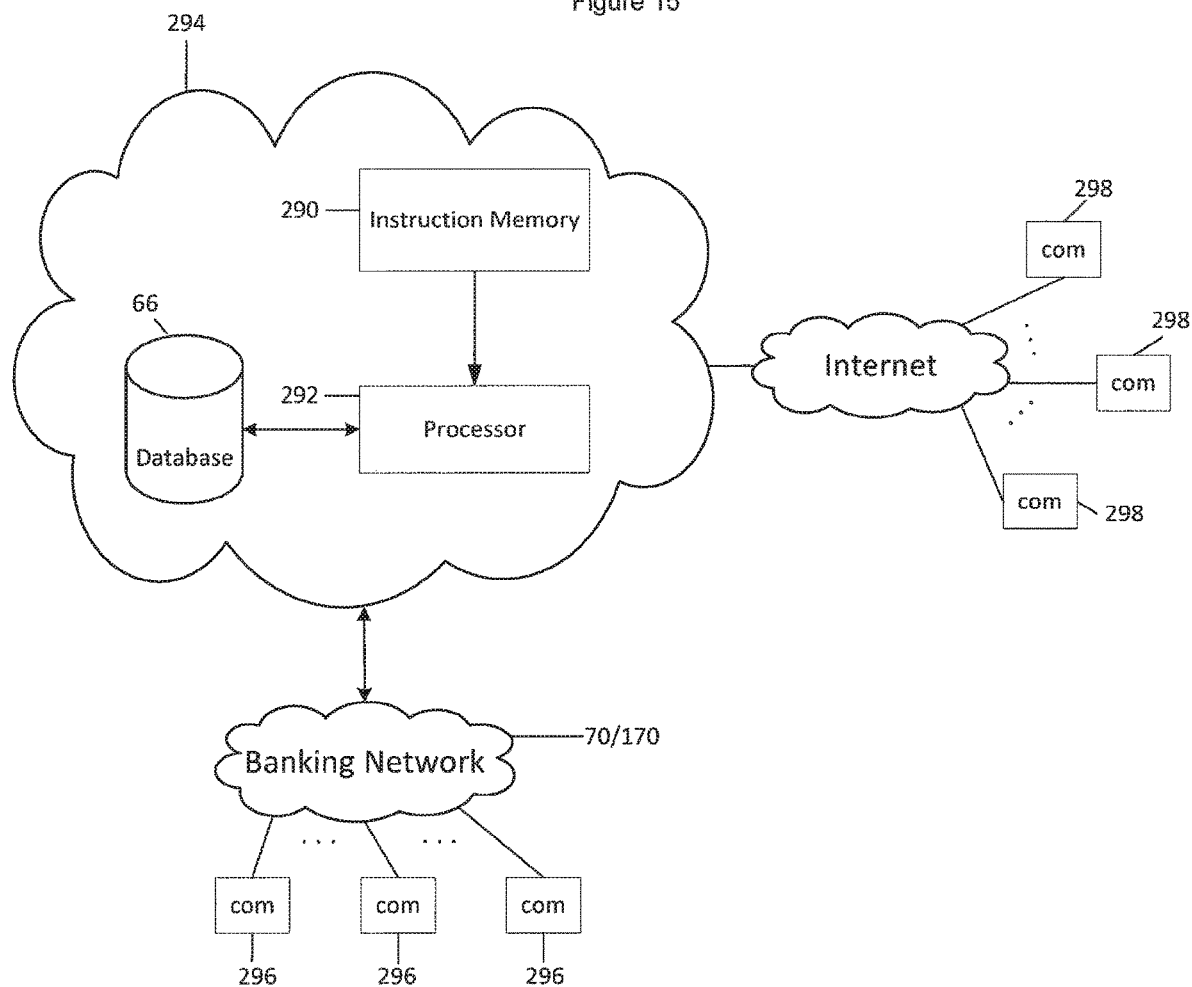
FIG. 15 illustrates a sample hardware platform for implementing the system and method of the exemplary embodiments.

FIG. 15 illustrates a sample hardware platform for implementing the system and method of the exemplary embodiments. As illustrated, the payment information stored in the database 66 and the instructions for implementing the methods described herein from instruction memory 290 are provided to a processor 292 for processing the instructions and information to implement the features and methods described herein. In an exemplary embodiment, the database 66, instruction memory 290, and processor 292 provide a platform 294 available in the cloud that is made secure using conventional encryption techniques. Banking networks 70/170 described herein access the platform 294 through a direct link or a secure internet connection. Computers 296 provide interfaces for providing inputs to be processed and for receiving displays of processed outputs from platform 294. Other parties may access the platform 294 via secure internet connections via their computing devices 298.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. As used herein and in the claims, a computer readable medium specifically excludes a modulated signal. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. In addition, those skilled in the art will appreciate that the disclosed steps may be reordered, equivalent elements may be substituted for those specifically disclosed, and certain features of the present invention may be used independently of other features—all without departing from the present invention as outlined in the appended drawings and claims.

What is claimed:

1. A method implemented by a computer which performs electronic payment to multiple payees of respective payment stakes of a single electronic payment transaction and/or respective payment stakes of a multiple payee check payment, comprising the steps of:

executing a multiple payee payment and/or a multiple payee check handling and clearing process, by a payment system using a Notification, Endorsement, Debits, Disbursements (NEDD) protocol, including receiving the payor's check information;

receiving identification of multiple payees and specifying respective payment stakes due each payee distributed according to a pre-set disbursement or distributed based on an agreement of each payee for each other's stake;

placing a multiple payee hold on a payor's account;

accepting multiple payee check deposit via an Automated Teller Machine (ATM);

alerting respective payees that funds are available;

enabling payees electronic check endorsements;

receiving electronic payees' endorsements and confirmation of identity and providing an endorsement file to the payor for each payee;

debiting the payor's account by the respective payment stakes due to the respective payees; and disbursing the respective payment stakes to the respective payees through a payment network.

2. A method as in claim 1, further comprising enabling the payor to specify payment stakes to be paid to each payee and distributing the specified payment stakes to each payee.

3. A method as in claim 1, further comprising enabling one or more of the multiple payees to specify payment stakes agreed upon by the payees to be paid to each payee and redirecting payment to each payee in accordance with the specified agreed upon payment stakes when the payment stakes are unspecified by the payor.

4. A method as in claim 1, wherein placing a multiple payee hold on the payor's account comprises creating a temporary transactional account and crediting the account with an amount totaling the payment to all payees debited from the payor's account through the payor's payment/banking network, then debiting the temporary transaction account in the exact portions based on the payment stake to be disbursed to each payee.

5. A method as in claim 4, wherein the payor's funds are debited and a credit is made using a temporary transaction account.

6. A method as in claim 1, wherein alerting respective payees comprises simultaneously notifying the respective payees of payment availability via a communication network and providing each payee with instructions on how to proceed to collect the payee's funds.

7. A method as in claim 6, wherein simultaneously notifying the respective payees of payment availability comprises sending messages to the respective payees by at least one of: email, SMS text, phone call, and integration with a payee's payment platform.

8. A method as in claim 1, wherein enabling payee electronic check endorsement comprises prompting each payee to endorse a check image of the multiple payee check via an interface whereby each payee affixes their individual endorsement to a back of the check image.

9. A method as in claim 8, further comprising making a copy of the check image with endorsements of each payee visible to all payees.

10. A method as in claim 8, further comprising forwarding the check image to the payor's bank for clearing once all payees have endorsed the check image.

11. A method as in claim 1, further comprising providing endorsement forms and/or payment redirection authorization requests or forms to the respective payees and enabling exchange of documents including the endorsement forms and/or payment redirection authorization forms among the payor and the respective payees.

12. A method as in claim 1, wherein debiting the temporary transaction account by the respective payment stakes due to the respective payees after receiving all endorsements and confirmation of identity for each payee.

13. A method as in claim 12, wherein the payor's funds are debited through an automated clearing house or a payment system or network or a transfer via debit or credit card network or Real-time Transport Protocol (RTP) network.

14. A method as in claim 1, wherein disbursing the respective payment stakes to the respective payees comprises disbursing the respective payment stakes in accordance with a workflow arrangement with at least one of the payees.

15. A method as in claim 1, further comprising storing payor and payee identity, address, and bank account information and the endorsement file in a database.

16. A method as in claim 15, wherein the payor is an insurance carrier and the payees are any one of a bank/mortgagee/lienholder, policyholder/claimant, and any other additional stakeholder(s) on an insurance settlement.

17. A method as in claim 16, further comprising synchronizing the database with the insurance carrier's database.

18. A system which performs electronic payment to multiple payees of respective payment stakes of a single electronic payment transaction and/or respective payment stakes of a multiple payee check payment, comprising:
   a database storing payor and payee identity, address, and bank account information;
   a processor that executes instructions and communicates outputs to a payor and respective payees; and
   a memory that stores instructions that when executed by the processor cause the processor to perform the steps of:
   executing a multiple payee payment and/or a multiple payee check handling and clearing process by a payment system using a Notification, Endorsement, Debits, Disbursements (NEDD) protocol, including receiving the payor's check information;
   receiving identification of multiple payees and specifying respective payment stakes due each payee distributed according to a pre-set disbursement or distributed based on an agreement of each payee for each other's stake;
   placing a multiple payee hold on a payor's account; accepting multiple payee check deposit via a n ATM; alerting respective payees that funds are available; enabling payees' electronic check endorsements;
   receiving electronic payees' endorsements and confirmation of identity and providing an endorsement file to the payor for each payee;
   debiting the payor's account by the respective payment stakes due to the respective payees; and
   disbursing the respective payment stakes to the respective payees through a payment network.

19. A system as in claim 18, wherein the memory further stores instructions that when executed by the processor cause the processor to enable the payor to specify payment stakes to be paid to each payee and to distribute the specified payment stakes to each payee.

20. A system as in claim 18, wherein the memory further stores instructions that when executed by the processor cause the processor to enable one or more of the multiple payees to specify payment stakes agreed upon by the payees to be paid to each payee and to redirect payment to each payee in accordance with the specified agreed upon payment stakes when the payment stakes are unspecified by the payor.

21. A system as in claim 18, wherein the instructions for placing a multiple payee hold on the payor's account comprises instructions for placing a multiple payee hold through the payor's payment/banking network in an amount of total payment to all payees and debiting the payor's account comprises debiting the temporary transaction account in specific portions based on the payment stakes to be disbursed to each payee.

22. A system as in claim 21, wherein the memory further stores instructions that when executed by the processor cause the processor to create a temporary transaction account from which the payor's funds are debited and to which a credit is made in the debiting step.

23. A system as in claim 18, wherein instructions for alerting respective payees comprises instructions for simultaneously notifying the respective payees of payment availability via a communication network and instructions for providing each payee with instructions on how to proceed to collect the payee's funds.

24. A system as in claim 23, wherein instructions for simultaneously notifying the respective payees of payment availability comprises instructions for sending messages to the respective payees by at least one of: email, SMS text, phone call, and integration with a payee's payment platform.

25. A system as in claim 18, wherein the memory further stores instructions that when executed by the processor cause the processor to create an interface that enables payee electronic check endorsement by prompting each payee to endorse a check image of the multiple payee check whereby each payee is enabled to affix their individual endorsement to a back of the check image.

26. A system as in claim 25, wherein the memory further stores instructions that when executed by the processor cause the processor to make a copy of the check image with endorsements of each payee visible to all payees.

27. A system as in claim 25, wherein the memory further stores instructions that when executed by the processor cause the processor to forward the check image to the payor's bank for clearing once all payees have endorsed the check image.

28. A system as in claim 18, wherein the memory further stores instructions that when executed by the processor cause the processor to provide endorsement forms and/or payment redirection authorization requests or forms to the respective payees and to enable exchange of documents including the endorsement forms and/or payment redirection authorization forms among the payor and the respective payees.

29. A system as in claim 18, wherein instructions for debiting the temporary transaction account by the respective payment stakes due to the respective payees after receiving all endorsements and confirmation of identity for each payee.

30. A system as in claim 29, further comprising an automated clearing house, payment system or network through which the payor's funds are debited or a transfer via debit or credit card network or RTP network.

31. A system as in claim 18, wherein the memory further stores instructions that when executed by the processor cause the processor to implement a workflow arrangement with at least one of the payees that controls disbursement of the respective payment stakes to the respective payees.

32. A system as in claim 18, wherein the endorsement file is stored in the database.

33. A system as in claim 32, wherein the payor is an insurance carrier and the payees are any one of a bank/mortgagee/lienholder, policyholder/claimant, and any other additional stakeholder(s) on an insurance settlement and the database is synchronized with the insurance carrier's database.

34. A non-transitory computer readable medium that stores instructions that when executed by a processor causes the processor to facilitate electronic payment to multiple payees of respective payment stakes of a single electronic payment transaction and/or respective payment stakes of a multiple payee check payment by performing the steps of:
    executing a multiple payee payment and/or a multiple payee check handling and clearing process, by a payment system using a Notification, Endorsement, Debits, Disbursements (NEDD) protocol, including receiving the payor's check information;
    receiving identification of multiple payees and specifying respective payment stakes due each payee distributed according to a pre-set disbursement or distributed based on an agreement of each payee for each other's stake;
    placing a hold on a payor's account; accepting multiple payee check deposit via an ATM; alerting respective payees that funds are available; enabling payees electronic check endorsements;
    receiving electronic payees' endorsements and confirmation of identity and providing an endorsement file to the payor for each payee;
    debiting the payor's account by the respective payment stakes due to the respective payees; and
    disbursing the respective payment stakes to the respective payees through a payment network.

35. A method as in claim 1, wherein receiving identification of multiple payees comprises scanning a payor's check and extracting information including names of the payees using optical character recognition.

36. A system as in claim 18, further comprising an optical character recognition devices that scans a payor's check and extracts information including names of the payees.

* * * * *